(12) United States Patent
Hovland

(10) Patent No.: US 7,152,547 B1
(45) Date of Patent: Dec. 26, 2006

(54) SEISMIC VESSEL HAVING MOTION-STABILIZED HELICOPTER LANDING PLATFORM

(75) Inventor: Vidar Hovland, Hagan (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/345,013

(22) Filed: Feb. 1, 2006

(51) Int. Cl.
*B63B 35/50* (2006.01)

(52) U.S. Cl. ..................................... 114/261

(58) Field of Classification Search ............... 114/261; 244/116, 114 R; 212/277, 308
See application file for complete search history.

(56) References Cited

U.S. PATENT DOCUMENTS

| | | | |
|---|---|---|---|
| 1,558,567 A * | 10/1925 | Schein | 114/261 |
| 3,509,636 A * | 5/1970 | Hansen | 33/366.12 |
| 4,566,372 A | 1/1986 | Zandel et al. | |
| 4,808,958 A | 2/1989 | Hewitt et al. | |
| 5,431,406 A * | 7/1995 | Ishii | 248/396 |
| 6,523,491 B1 * | 2/2003 | Moise et al. | 114/265 |
| 6,549,139 B1 * | 4/2003 | Shaw, Jr. | 340/685 |
| 7,040,247 B1 | 5/2006 | Chouery | |
| 2002/0189116 A1 * | 12/2002 | Yang et al. | 33/366.23 |

* cited by examiner

Primary Examiner—Stephen Avila
(74) Attorney, Agent, or Firm—E. Eugene Thigpen; Richard A. Fagin

(57) ABSTRACT

A helipad motion compensation system for a vessel includes at least one controllable length actuator operatively coupled between the helipad and the vessel. The system also includes an attitude sensor disposed on at least one of the helipad and the vessel. The sensor produces signals corresponding to change in attitude of the helipad. A controller is in operative communication with the sensor and is arranged to operate the at least one actuator. The actuator is operable to substantially maintain an attitude of the helipad to compensate for motion of the vessel.

11 Claims, 5 Drawing Sheets

SEISMIC VESSEL HAVING MOTION-STABILIZED HELICOPTER LANDING PLATFORM

CROSS-REFERENCE TO RELATED APPLICATIONS

Not applicable.

Statement regarding federally sponsored research or development

Not applicable.

BACKGROUND OF THE INVENTION

1. Field of the Invention

The invention relates generally to the field of aircraft access to floating structures. More particularly, the invention relates to helicopter landing pads or platforms associated with floating structures such as seismic survey vessels.

2. Background Art

Floating marine structures known in the art include marine seismic survey seismic vessels. Such vessels are used to tow seismic survey sensors and seismic energy sources in a body of water such as the lake or the ocean. Seismic survey seismic vessels typically include onboard equipment, known collectively as a recording system, that makes records with respect to time of signals generated by the seismic survey sensors, determines geodetic position of the seismic vessel, energy source and sensors at any time, and actuates the source at selected times.

As with any marine seismic vessel, at least some personnel are required to navigate the seismic vessel, and operate the various seismic data acquisition equipment on board the seismic vessel. Typically, seismic survey seismic vessels include a helicopter landing pad to facilitate movement of personnel onto and from the seismic vessel while the vessel is at sea. As a matter of personnel safety, however, there are limits to the amount of seismic vessel movement, other than in the direction of travel of the seismic vessel, for which helicopter landing and takeoff can be safely performed. Such movement has three components known as pitch, roll and heave. Pitch is rotation of the seismic vessel about an axis transverse to the centerline of the ship. Roll is rotation of the seismic vessel about its centerline. Heave is motion of the ship upwardly and downwardly. Regulatory authorities in some countries, for example, have imposed limits of two degrees maximum pitch and roll for which helicopter landing is permitted. Heave of more than one or two meters may also make it unsafe to land a helicopter on a seismic survey seismic vessel.

Because seismic survey operations are subject to periodic personnel changes while the seismic vessel is at sea, and because sea conditions frequently make helicopter personnel changes unsafe, and thus impossible to perform, what is needed is a system to compensate the helicopter landing pad for such seismic vessel motion. Such as system would increase the utility of the helicopter landing pad, and would facilitate personnel changes. Such a system would also reduce the risk to personnel in the event an emergency evacuation of the vessel was required.

SUMMARY OF THE INVENTION

One aspect of the invention is a helipad motion compensation system for a vessel. A system according to this aspect of the invention includes at least one controllable length actuator operatively coupled between the helipad and the vessel. The system also includes an attitude sensor disposed on at least one of the helipad and the vessel. The sensor produces signals corresponding to change in attitude of the helipad. A controller is in operative communication with the sensor and is arranged to operate the at least one actuator. The actuator is operable to substantially maintain an attitude of the helipad to compensate for motion of the vessel.

In one embodiment, the attitude is adjusted along one direction of motion. In another embodiment, the system includes at least three actuators, and the attitude is adjusted along two, orthogonal directions of motion. In another embodiment, the system includes an acceleration sensor and compensates the attitude along the two orthogonal directions and compensates the helipad for changes in geodetic elevation thereof.

Another aspect of the invention is a method for adjusting an attitude and elevation of a helipad for motion of a vessel. A method according to this aspect of the invention includes measuring a attitude of at least one of the helipad and the vessel, and moving the helipad to substantially maintain a constant attitude. In one embodiment, the moving is along one direction of motion. In another embodiment, the moving is along two orthogonal directions. In another embodiment, the moving maintains both attitude and geodetic elevation of the helipad substantially constant.

Other aspects and advantages of the invention will be apparent from the following description and the appended claims.

DETAILED DESCRIPTION

Figure 1:
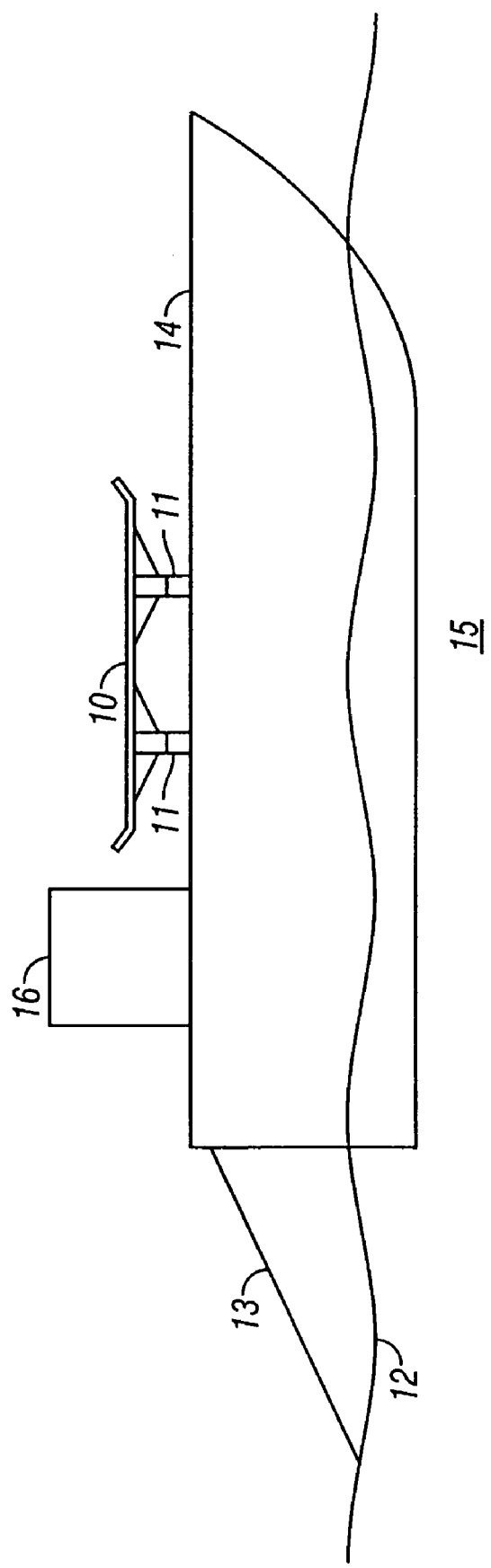
FIG. 1 shows a side view of a seismic survey seismic vessel having a helicopter landing pad including a motion compensation system according to the invention.

A side view of a typical floating structure such as a seismic survey seismic vessel is shown in FIG. 1. The seismic vessel 14 is shown moving along the surface 12 of a body of water 15 as it would ordinarily be used in marine seismic surveying operations. The seismic vessel 14 includes a structure 16 thereon that may include, for example, (none of the following of which is shown separately) housing for various crew members, and a seismic data recording system, which as explained in the Background section herein may include equipment that makes records with respect to time of signals generated by seismic survey sensors, determines geodetic position of the seismic vessel 14, seismic energy source and seismic sensors at any time, and actuates the seismic energy source at selected times. The seismic vessel 14 is shown towing a lead-in-cable 13 of any type known in the art for seismic surveying which is ordinarily connected to one or more sensor streamers (not shown) wherein are located the seismic sensors (not shown).

The seismic vessel 14 includes a helicopter landing pad 10 thereon. The helicopter landing pad 10 is mounted to the seismic vessel 14 through a motion compensation system, shown generally at 11. For convenience, the helicopter landing pad 10 will be referred to herein as the "helipad." The structure of the helipad 10 itself is well known in the art. The purpose of the motion compensation system 11 is to adjust at least the attitude (orientation with respect to Earth's gravity) along at least one direction of motion, in some embodiments along two orthogonal directions of motion and in still other embodiments can adjust the geodetic elevation of the helipad 10 so that the helipad 10 is maintained substantially horizontal (perpendicular attitude with respect to Earth's gravity), and in a substantially constant geodetic elevation, notwithstanding certain types of motion of the seismic vessel 14 caused by disturbances along the water surface 12. As explained in the Background section herein, such motion may include pitch, roll and heave. Also as previously explained herein, pitch is rotation of the seismic vessel 14 about an axis transverse to the centerline of the ship. Roll is rotation of the seismic vessel 14 about its centerline. Heave is motion of the vessel upwardly and downwardly.

For purposes of defining the scope of the invention, motion of the helipad 10 along at least one direction means pitch or roll motion, and thus compensation for motion along the one direction means compensation for pitch or roll. Compensation along a second, orthogonal direction means compensation for the one of roll or pitch not compensated in embodiments that maintain attitude of the helipad along the one direction.

Figure 2:
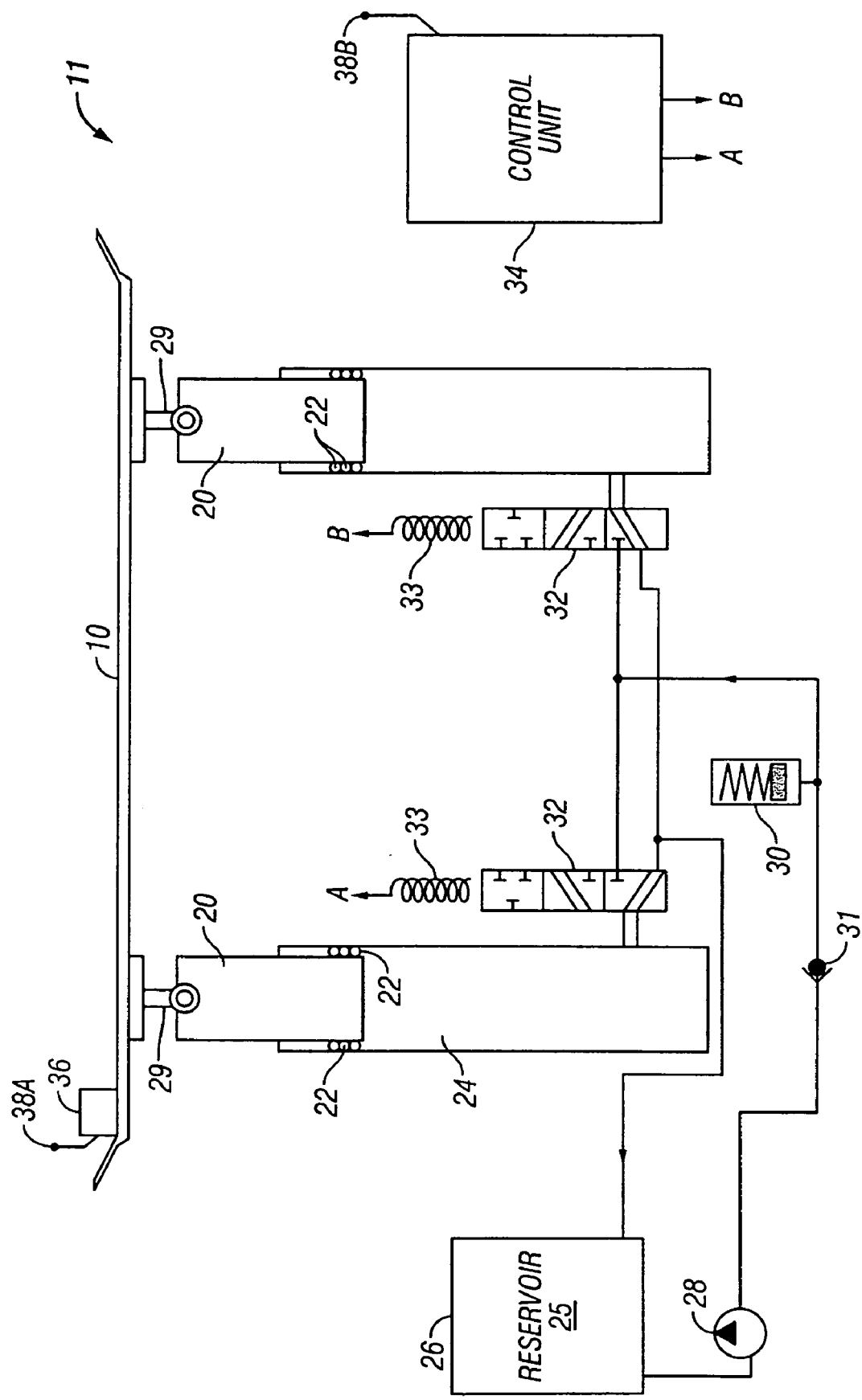
FIG. 2 shows an expanded view of one embodiment of the helicopter landing pad and a motion compensation system.

One embodiment of a motion compensation system 11 according to the invention is shown in expanded schematic view in FIG. 2. The motion compensation system 11 includes at least one, preferably three, and more preferably four, controllable-length actuators. The one or more actuators physically couple the helipad 10 to the seismic vessel and provide a controllable distance between the helipad 10 and a fixed surface on the seismic vessel (14 in FIG. 1) at each actuator position. In embodiments that provide motion compensation for the helipad 10 along only one direction, it is only necessary to have one such adjustable length actuator. In embodiments that provide motion compensation for the helipad along more than one direction, it is necessary to include a plurality of such actuators at spaced apart locations with respect to the plane surface of the helipad 10 to provide the capability of moving the helipad 10 along more than one direction. Such locations for a plurality of actuators will occur to one of ordinary skill in the art and are not intended to limit the scope of this invention.

In the present embodiment, the one or more actuators may each comprise an hydraulic cylinder 24 each having a piston or ram 20 slidably disposed therein. Each hydraulic cylinder 24 can be mounted to the fixed surface on the seismic vessel (14 in FIG. 1). Each ram 20 is forced outwardly from the cylinder 24 upon application of hydraulic pressure into the interior of the cylinder 24 below the ram 20. Typically the ram 20 will be sealed against the interior of the cylinder 24 by o-rings 22 or similar sealing element to prevent escape of the hydraulic pressure within the cylinder 24. The ram 20 in the present embodiment may be retracted into its respective cylinder 24 by the weight of the helipad 10 when the hydraulic pressure in the cylinder 24 is released.

The helipad 10 is preferably coupled to the end of each ram 20 by a spherical joint 29 or similar device that enables relative displacement between the plane of the helipad 10 and the axis of the ram 20 as the ram 20 is moved during operation of the system 11. In the present embodiment it is preferred that each of four cylinder/ram combinations is located near one circumferential edge of the helipad 10 so that the cylinder/ram combinations will substantially always be in compression irrespective of the location of any weight load on the upper surface of the helipad 10. By such arrangement of actuators the stability of the helipad 10 is increased when in combination with the motion compensation system 11. It may also be desirable to mount all but one of the cylinders 24 to the fixed surface on the vessel using a spherical joint or similar device to increase the range of motion through which the compensation system 11 may tilt the helipad 10 with respect to the vessel. In such embodiments, the one remaining hydraulic cylinder 24 and its associated ram 20 preferably have a much larger cross-sectional area than the other cylinders and rams, and have sufficiently strong mounting to both the vessel and to the helipad 10 to carry all of the lateral stresses that may be imparted to the helipad 10, such stresses being unable to be carried by ones of the cylinder/ram combinations that have spherical joints at both ends.

Four cylinder/ram combinations may be used in some embodiments of the motion compensation system 11 because the helipad 10 would thus be supported at four points, providing four times the degree of control over the attitude of the helipad 10 as having only three such ram/cylinder combinations. It should be understood that full control of attitude and elevation of the helipad 10 may be performed using only three cylinder/ram combinations. As previously explained, some embodiments may provide attitude adjustment along only one direction and may therefore use only one actuator.

The amount of extension of each ram 20 from each cylinder 24 can be controlled in the present embodiment by selectively applying hydraulic pressure to the interior of each cylinder 24. The hydraulic pressure can be selectively applied by an hydraulic system including the following components. A reservoir 26 stores a quantity of hydraulic fluid 25 sufficient to fully charge, to the full extension of each ram 20 therein, all the hydraulic cylinders 24 used in the particular embodiment. The hydraulic fluid 25 is pumped out of the reservoir 26 under pressure by an hydraulic pump 28. The discharge side of the hydraulic pump 28 is preferably conducted through a check valve 31 to an accumulator 30. The accumulator 30 stores the hydraulic fluid 25 at a selected operating pressure. Such storage enables using a relatively small volume rate hydraulic pump 28, because the volume of hydraulic fluid 25 needed to move the rams 20 will be substantially supplied by the accumulator 30, rather than by the hydraulic pump 28. The check valve 31 prevents loss of hydraulic pressure when the hydraulic pump 28 is turned off, and isolates the hydraulic pump 28 from any momentary pressure increases (spikes) in the hydraulic system as the rams 20 are operated. In the present embodiment, the hydraulic pressure from the accumulator 30 may be selectively applied to each cylinder 24 by a corresponding three-way valve 32, each operated by a respective solenoid 33. Each three-way valve 32 has a first position to port hydraulic fluid 25 from the accumulator 30 into the cylinder 24, a second position to vent the hydraulic fluid 25 in the cylinder 24 to the reservoir 26, and a third position to seal the cylinder 24 from entry or exit of hydraulic fluid 25. Only two such valves 32 are shown in FIG. 2, just as only two hydraulic cylinders 24 are shown for clarity of the illustration. An actual implementation of the motion compensation system 11 as explained above would include at least three, and preferably four such cylinders 24 and associated rams 20 as explained above.

As may be inferred from the above description of valve operation, the first valve position is selected to extend the ram 20 from the respective cylinder 24. The second position is selected to retract the ram 20 into its associated cylinder 24, wherein such retraction is effected by the weight of the helipad 10 on the ram 20. The third position is selected to maintain the extension position of the associated ram 20 from the respective cylinder 24, because the hydraulic fluid 25 is substantially incompressible. Operation of the respective solenoids 33 to move the associated valves 32 can be performed by a control unit 34 that will be explained in more detail below with reference to FIG. 3. Operative connection between the solenoids 33 shown in FIG. 2 and the control unit 34 is shown at A and B. The embodiment of cylinder 24 and ram 20 shown in FIG. 2 is referred to as "single acting" because hydraulic pressure is used to move the ram 20 in only one direction with respect to the cylinder 24. As explained above, weight of the helipad 10 itself may be used to retract the ram 20 into the cylinder. In the event the weight in some implementations is insufficient to retract the ram 20 properly, the ram/cylinder combination shown in FIG. 2 may be substituted by a so-called "double acting" ram and cylinder combination as shown in FIG. 2C. The cylinder 24 in FIG. 2C has inlets 24B, 24A for pressurized fluid from the pump (26 in FIG. 2) to enable application of hydraulic pressure on either side of the sealing o-rings 22. Application of hydraulic pressure below the o-rings 22 will extend the ram 20 from the cylinder 24 as in the embodiment of FIG. 2, however, application of hydraulic pressure above the o-rings 22 will cause the ram 20 to retract. A three way valve 32A can be arranged as shown in FIG. 2C to apply hydraulic pressure into the cylinder 24 on one side of the o-rings 22, and vent the other side to the reservoir (25 in FIG. 2). By moving the position of the three way valve 32A to a second position, both sides of the o-rings 22 can be sealed from escape or entry of hydraulic fluid so as to maintain the extension position of the ram 20. By further moving the three way valve 32A to a third position, the hydraulic connections of the hydraulic pressure from the pump 26 and to the reservoir 25 to the two sides of the o-rings 22 can be reversed, thereby reversing the movement of the ram 20 with respect to the cylinder 24. In double acting embodiments, it is typically necessary to seal the longitudinal end of the cylinder 24 to the ram 20 to create a sealed hydraulic chamber above the o-rings 22. Such can be performed by including a seal 22A of types well known in the art for such purpose, as shown in FIG. 2C. One such seal is shown, for example, in U.S. Pat. No. 4,566,372 issued to Zandel et al.

Returning to FIG. 2, attitude and elevation of the helipad 10 may be measured by sensors on a sensor unit 36 mounted thereto, which will also be explained in more detail below with reference to FIG. 3. In the present embodiment, the sensor unit 36 may be in wireless communication with the control unit 34, each unit having thereon a respective antenna 38A, 38B. As will be further explained below, when measurement from the sensors (FIG. 3) in the sensor unit 36 indicate a change in attitude and/or elevation of the helipad 10, the control unit 34 operates the ones of the solenoids 33 required to extend and/or retract the appropriate ones of the rams 20 so as to return the attitude of the helipad 10 to horizontal, and/or to restore the elevation of the helipad 10 to compensate for heave of the seismic vessel (12 in FIG. 1). The sensor unit 36 may also be electrically coupled to the control unit 34 using conventional "hard" wiring.

Figure 2A:
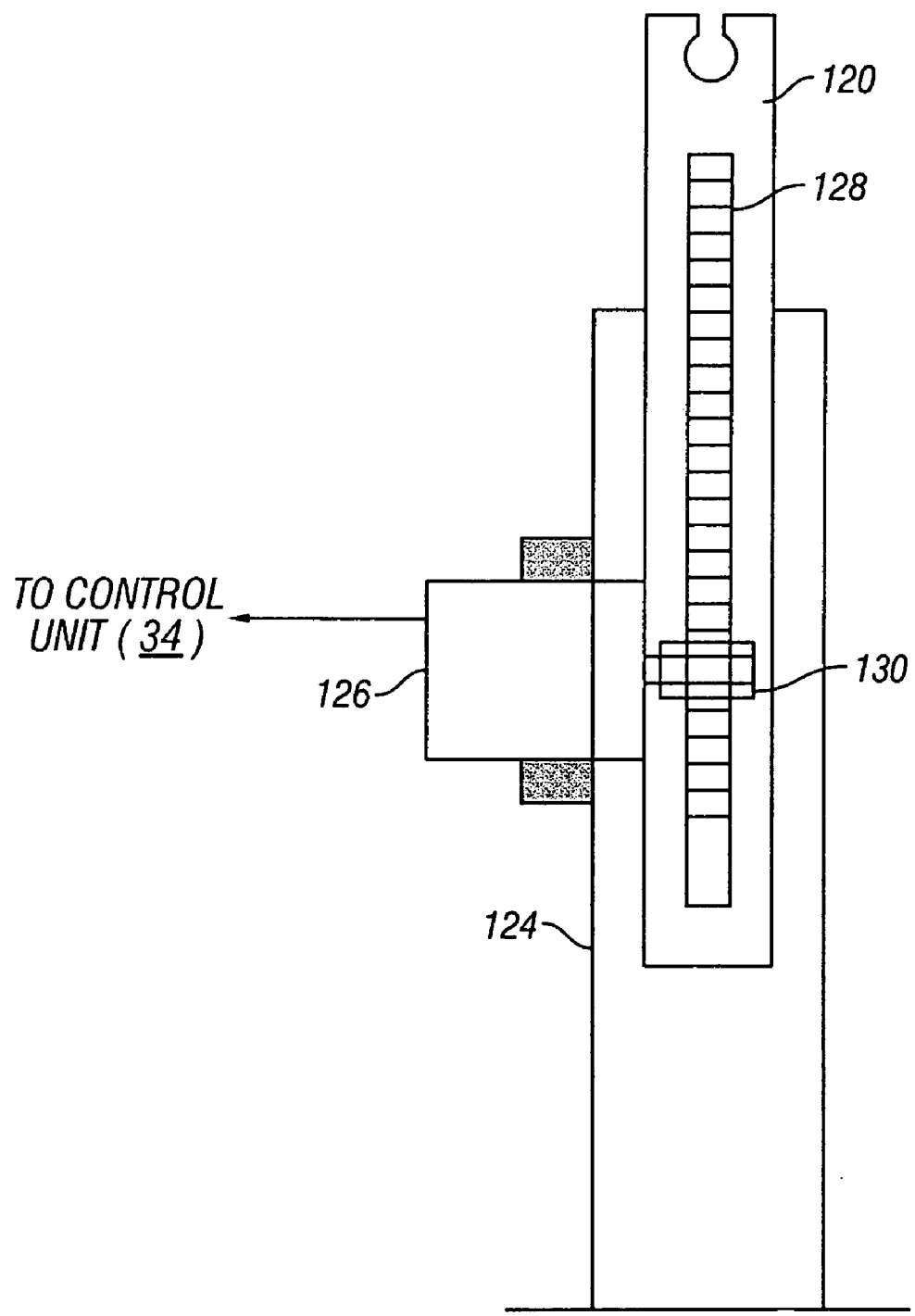
FIG. 2A shows another embodiment of a motion system actuator for the motion compensation system shown in FIG. 2.
Figure 2C:
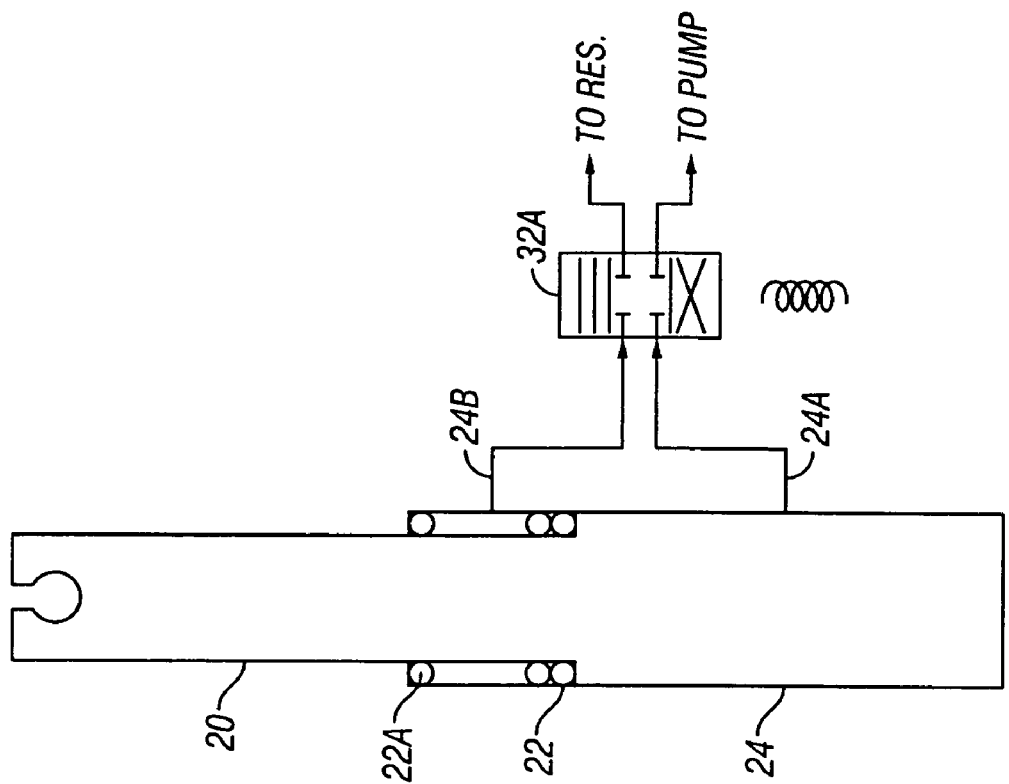
FIG. 2C shows one embodiment of a double acting hydraulic unit for an actuator.

FIG. 2A shows an alternative embodiment of one of the actuators. A support frame 124 is affixed to the surface of the seismic vessel (14 in FIG. 2) substantially as is the cylinder shown at 24 in FIG. 2. A ram 120 is slidably engaged with the support frame 124. The ram 120 includes a rack 128 thereon having spur-type gear teeth. An electric, hydraulic or air operated motor 126 is affixed to the frame 124 and has a spur gear 130 coupled to its output shaft. Rotation of the motor 126 drives the spur gear 130, which motion is translated to the rack 128 to extend or retract the ram 120 with respect to the support frame 124. Thus, rotation of the motor 126 controls extension of the ram 120. Operation of the motor 126 to adjust the attitude and elevation of the helipad (10 in FIG. 2) is substantially similar to operation of the ram/cylinder embodiment explained with reference to FIG. 2, and will be explained in more detail below with reference to FIG. 3.

Figure 3:
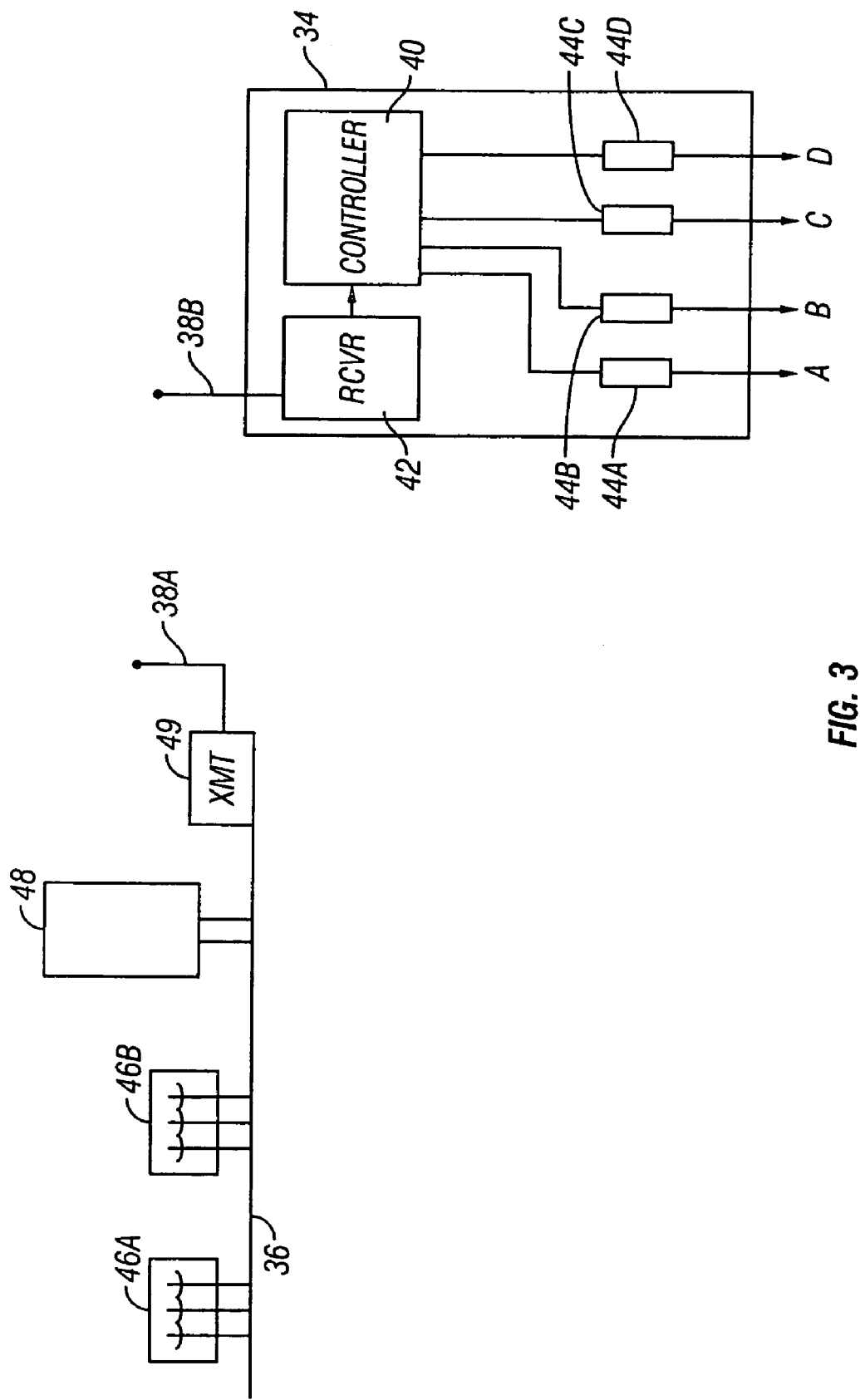
FIG. 3 shows an expanded view of a sensor unit and a control unit according to one embodiment of the invention.

FIG. 3 shows an expanded schematic view of the sensor unit 36 and the control unit 34 of FIG. 2. The sensor unit 36 includes sensors responsive to the attitude and vertical motion of the helipad (10 in FIG. 2). In the present embodiment, the attitude, which can include pitch and roll, may be measured using two, orthogonally disposed electrolytic bubble level sensors, shown at 46A and 46B. Each bubble level sensor 46A, 46B is oriented such that rotational movement of the helipad (10 in FIG. 2) in the sensitive direction thereof will result in a signal from each bubble level sensor 46A, 46B indicative of the degree of pitch and/or roll. Suitable electrolytic bubble level sensors are sold under model no. SP500 by Spectron, Inc., Hauppage, N.Y. Bubble level sensors have the advantage of generating a signal that is directly proportional to the degree of angular displacement of the sensor in its sensitive direction, they are relatively immune to damage by shock and are relatively inexpensive. It should be understood that other types of sensors, such as accelerometers, could also be used to measure pitch and roll. For purposes of the present invention, it is only necessary to provide a sensor that is responsive to angular displacement of the plane of the helipad (10 in FIG. 2) from horizontal.

The sensor unit 36 also may include an accelerometer 48 oriented such that its sensitive axis is normal to the plane of the helipad (10 in FIG. 1). A suitable accelerometer is sold under model designation ADXL05 by Analog Devices, Inc., Norwood, Mass. The accelerometer 48 thus measures acceleration substantially normal to the plane of the helipad (10 in FIG. 1). Measurements of acceleration may be used to determine an amount of motion of the helipad normal to Earth's gravity as a result of heave of the seismic vessel (12 in FIG. 1). Typically an amount of such movement may be determined by double integration of the signal from the accelerometer 48. It should be noted that accelerometers typically have a non-zero output at zero acceleration, known as "bias." Calculations of position made by double integration of the accelerometer 48 signal are thus susceptible to drift. One technique known in the art to avoid drift is to bandpass filter the signal from the accelerometer to remove components from zero frequency (which would include the drift) up to a minimum expected have frequency (on the order of 0.01 Hz).

Signals from each of the bubble level sensors 46 and the accelerometer 48 may be conducted by a wireless transmitter 49, through an associated antenna, to a receiver 42 in the control unit. The control unit 34 may include a microprocessor based controller 40 that uses the signals from the sensor unit 36 to calculate an amount of pitch, roll and heave affecting the helipad (10 in FIG. 2). Upon making such calculations, the controller operates selected ones of solenoid drivers 44A, 44B, 44C, 44D each connected to a corresponding one of the valve-operating solenoids (33 in FIG. 2). The corresponding one of the cylinders (24 in FIG. 2) is pressurized by hydraulic connection to the accumulator (30 in FIG. 2) or depressurized by venting to the reservoir (26 in FIG. 2) until the attitude and elevation of the helipad (10 in FIG. 2) are restored. It is contemplated that by maintaining the attitude of the helipad (10 in FIG. 2) substantially horizontal, using the bubble level measurements, the acceleration measurements will be substantially entirely related to vertical (heave) motion of the vessel, and thus the elevation correction calculated by double integration of the accelerometer measurements will be substantially accurate. Alternatively, the controller 40 can be programmed to impart an acceleration to the helipad by simultaneous actuation of all four actuators that is opposite the direction and substantially equal in amplitude to the measurement of acceleration made by the accelerometer 48. Thus, the net vertical acceleration on the helipad can be maintained at substantially zero, and the geodetic elevation will be maintained substantially constant.

In other embodiments, the bubble level sensors may be substituted by gyroscopes or similar sensors that are responsive to angular acceleration. In other embodiments, the sensors may include three, mutually orthogonal accelerometers. The controller in such embodiments may be programmed or arranged to determine gravitational orientation of the helipad (10 in FIG. 1) from the DC (time invariant) component of acceleration measured at each of the three accelerometers. When the helipad is moved such that its attitude changes, the direction of Earth's gravity with respect to the helipad will correspondingly change. The controller 40 may then operate those of the actuators required to restore the attitude of the helipad to horizontal. In addition, displacement of the helipad elevation by vessel heave may be corrected or adjusted as explained with respect to the embodiment described above with reference to FIG. 2.

In other embodiments, the accelerometer (48 in FIG. 2) used to measure vertical acceleration may be omitted, and the motion compensation system may only adjust the attitude of the helipad. In such embodiments it is only necessary to provide an attitude sensor, such as the bubble level sensors explained with reference to FIG. 3. Such embodiments should have at least three, and preferably four actuators, such as explained with reference to FIG. 2 and FIG. 2A, because orienting the plane of the helipad requires controlling the distance between the helipad and the vessel at at least three points on the helipad. Structure of the actuators may be substantially similar to that explained above with reference to FIG. 2 and FIG. 2A. The controller (40 in FIG. 3) in such embodiments may be arranged to operate the actuators only to maintain the attitude of the helipad substantially horizontal.

Figure 2B:
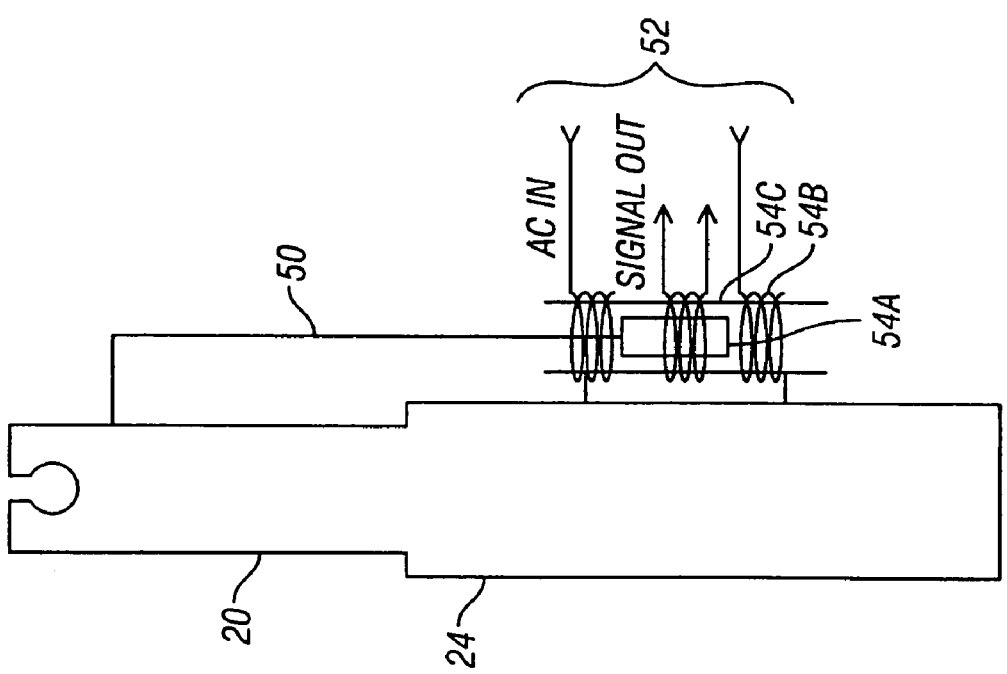
FIG. 2B shows one embodiment of an actuator including a sensor for measuring an amount of extension thereof.

In other embodiments, the sensor unit 36 may be mounted to or in the vessel itself, rather than on the helipad 10. In such embodiments, the various sensors in the sensor unit 36 will make measurements along one or more directions of motion of the vessel itself, rather than that of the helipad 10. Some implementations may use motion detection devices (not shown separately) forming part of the navigation equipment ordinarily disposed on board the vessel rather than a separate sensor unit. In any of the foregoing implementations that measure vessel motion rather than helipad attitude, the control unit 34 is preferably configured to respond to an amount of extension of the one or more actuators, or to respond to a distance between the fixed position on the vessel and the undersurface of the helipad 10 at the position of the actuator. In one embodiment, a sensor may be coupled to the one or more actuators that generates a signal responsive to the extension length of the actuator. One such sensor is shown schematically in FIG. 2B. A rod is coupled to the ram 20 of the actuator such that movement of the ram 20 correspondingly moves the rod 50. The rod is coupled to a ferrite or other magnetically permeable core 54A that forms part of a linear variable differential transformer (LVDT) shown generally at 52. The LVDT 52 includes wire coils 54B preferably wrapped around an electrically non-conductive, non-ferromagnetic bobbin 54C having an internal diameter such that the core 54A can move freely along the length thereof. Some of the coils 54B are energized with alternating current. Other of the coils 54B are functionally coupled to the control unit (34 in FIG. 2). Movement of the core 54A inside the coils 54B produces a voltage signal, detectable by the control unit, that corresponds to the position of the core 54A within the coils 54B. Such signal can be interpreted by the controller to determine the extension length of the ram 20 from the cylinder 24. In such embodiments, change in measured attitude of the vessel can be used by the controller to calculate an extension length for the one or more actuators to restore the attitude of the helipad to horizontal and/or maintain geodetic elevation thereof. A suitable form of LVDT is described, for example, in U.S. Pat. No. 4,808,958 issued to Hewitt et al. Other devices for measuring extension of the ram and/or distance between the vessel and the helipad surface include acoustic devices and laser range finders, among others.

Embodiments of a helipad having a motion compensating system according to the various aspects of the invention may provide increased safety in takeoff and landing of helicopters on the vessels including such systems, and may increase the time during which takeoffs and landings may occur by compensating for sea conditions that might otherwise prevent helicopter access to the affected vessel. Although the description of the invention is in terms of a seismic survey vessel, it should be clearly understood that the invention is applicable on any floating structure that has a helicopter landing pad. Accordingly, the invention is not limited to seismic survey vessels, or even ships that ordinarily move through the water. As other examples of vessels that may use the invention, a semisubmersible drilling platform, either moored or dynamically positioned, can also be advantageously equipped with a helipad motion compensation system according to the invention. It should be noted that it is not necessary, for purposes of practicing the invention, to compensate all of the ship motion in maintaining attitude and elevation of the helipad. As explained in the Background section herein, some countries have imposed regulations as to the maximum pitch and/or roll angle that may be sustained by a helipad and still carry out helicopter takeoff and landing procedures. For purposes of the invention, in some implementations it may be sufficient to compensate just enough attitude and/or elevation movement to cause the helipad attitude and/or elevation to remain within regulatory limits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A helipad motion compensation system for a vessel, comprising:
   at least three controllable length actuators operatively coupled between the helipad and the vessel;
   a first attitude sensor configured to measure an attitude of at least one of the helipad and the vessel along at least one direction;
   a second attitude sensor configured to measure motion of at least one of the helipad and the vessel alone a second direction orthogonal to the at least one direction;
   a controller in operative communication with the first and second sensors and the at least three actuators, the controller configured to operate the actuator to substantially maintain an attitude of the helipad to compensate for motion of the vessel along the first and second directions; and
   at least one acceleration sensor configured to measure vertical acceleration of at least one of the vessel and the helipad, the at least one acceleration sensor in operative communication with the controller, and wherein the controller is configured to operate the at least three actuators to maintain the helipad at a substantially constant geodetic elevation.

2. The system of claim 1 wherein at least one of the actuators comprises an hydraulic cylinder and a corresponding ram therein.

3. The system of claim 1 wherein at least one of the actuators comprises a motor operatively engaged with a rack, the rack slidably engaged with a support frame.

4. The system of claim 1 wherein at least one of the first and second attitude sensors comprises a bubble level sensor.

5. The system of claim 1 wherein at least one the actuators is coupled to the helipad by a spherical joint.

6. The system of claim 1 wherein at least one of the attitude sensors is operatively coupled to the controller by a wireless communication device.

7. A method for adjusting an attitude and elevation of a helipad for motion of a vessel, comprising:
   measuring an attitude of at least one of the helipad and the vessel along at least a first direction of motion;
   measuring attitude of at least one of the vessel and the helipad along a second direction orthogonal to the first direction;
   moving the helipad to maintain a substantially constant attitude along the first and second directions;
   measuring a vertical component of acceleration of at least one of the vessel and the helipad, and
   moving the helipad to maintain a substantially constant geodetic elevation.

8. The method of claim 7 wherein the measuring attitude comprises measuring with a bubble level sensor.

9. The method of claim 7 wherein the moving comprises changing a length of an actuator, wherein the helipad is coupled to the vessel by at least one controllable length actuator.

10. The method of claim 9 wherein the changing length comprises actuating an hydraulic cylinder having a ram therein.

11. The method of claim 9 wherein the changing length comprises rotating a motor in geared cooperation with a rack.

* * * * *